Nov. 30, 1971    H. B. ADAMS    3,623,245
TREE BALLING MACHINE

Filed Sept. 15, 1969    2 Sheets-Sheet 1

INVENTOR.
Harold B. Adams
BY John A. Hamilton
Attorney.

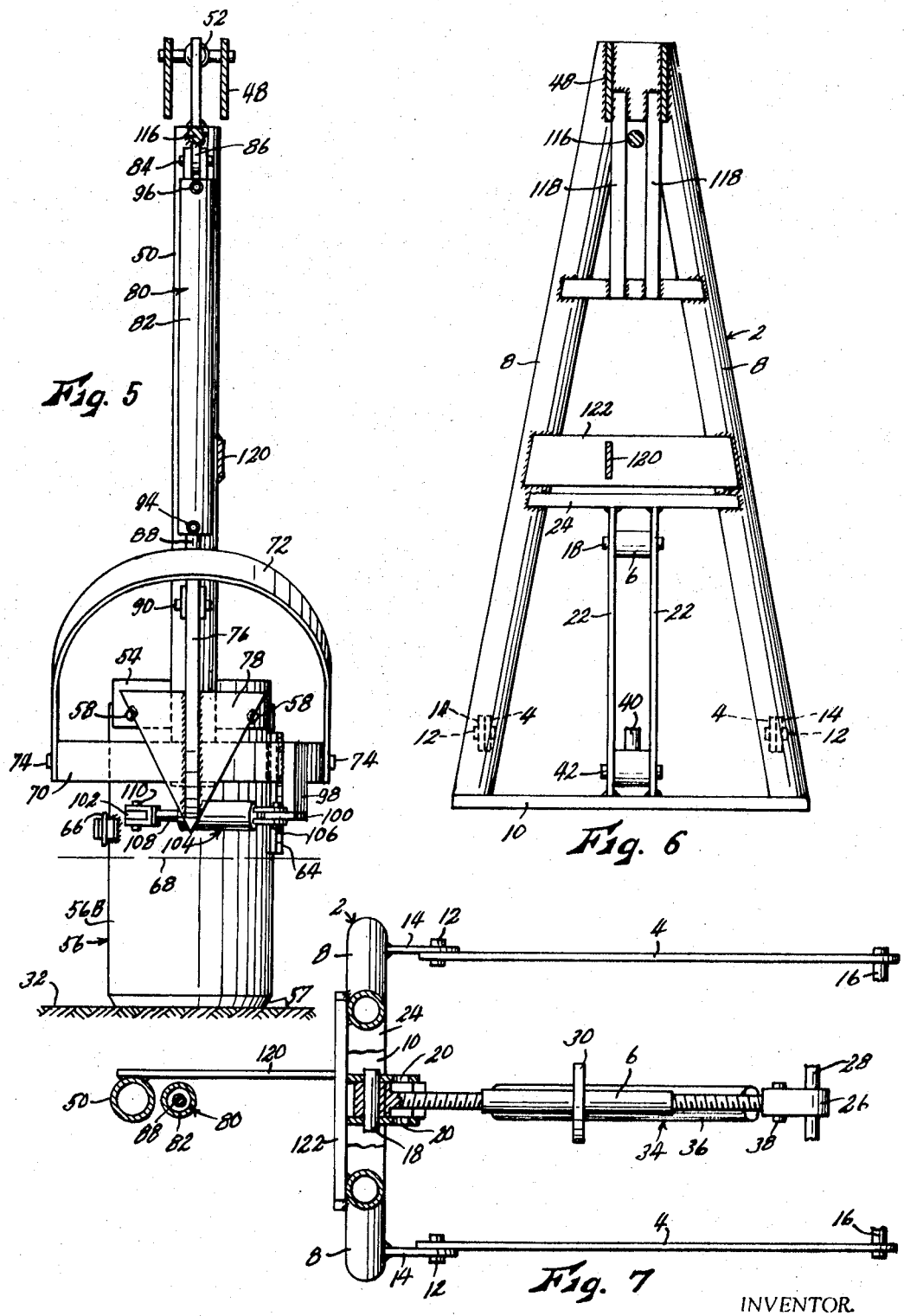

United States Patent Office 3,623,245
Patented Nov. 30, 1971

3,623,245
TREE BALLING MACHINE
Harold B. Adams, Sarcoxie, Mo. 64862
Filed Sept. 15, 1969, Ser. No. 858,034
Int. Cl. A01g 23/06
U.S. Cl. 37—2 R    2 Claims

ABSTRACT OF THE DISCLOSURE

A tree balling machine consisting of an open-bottomed, vertical cylindrical bucket diametrically split and with its sections hinged together to be closed about a small tree or other plant above ground level, a framework for supporting the bucket from a tractor or the like, power mechanism for pushing the bucket vertically into the ground to enclose the roots of the plant, power mechanism for oscillating the bucket about its vertical axis to assist its penetration into the ground, a cut-off tool adapted to be inserted horizontally into the ground beneath the bucket afer the bucket has been pushed into the ground, and power mechanism for elevating the bucket and the cut-off tool simultaneously, whereby the plant is removed from the ground with a ball of earth around its roots.

---

This invention relates to new and useful improvements in tree balling machines, being generally that class of machines intended for the purposes of removing small trees or shrubs from the ground with a ball of earth intact about their roots in order that they may be transported and replanted with minimum chances of damage, and with the best chance of healthy survival.

Although it involves several structural features and concepts, the overall primary object of the present invention is the provision of a machine of the character described which will remove the tree and ball of earth from the ground with a minimum amount of loosening or other disturbance of the soil in the earth ball, it being well known that such loosening or disturbance of the earth ball admits air and causes drying of the roots, and is often accompanied by physical damage to the roots such as tearing or the like. To this end, the machine utilizes a cylindrical, open-bottomed bucket adapted to be positioned about a tree, above ground level, then pushed downwardly into the ground to enclose the roots. During this insertion of the bucket, it slower edge usually engages at least some roots of the tree and these roots could be pushed and displaced, loosening soil thereabout. To prevent this, the lower bucket edge is sharpened, and provisions are made for oscillating the bucket about its vertical axis to produce a sawing or slicing action on the roots. The bucket is then elevated to lift the tree and earth ball. During this lifting movement, earth could fall from the lower end of the bucket to expose roots therein, and furthermore some roots, notably a taproot, may project from the bottom of the bucket and be embedded in soil beneath the bucket, and the pulling action of these roots could further loosen and dislodge soil from the bucket as it is elevated. To prevent this, there is provided a cut-off tool insertable horizontally beneath the bucket after the bucket has been pushed into the ground. This tool severs the downwardly projecting roots, and remains in place to support the earth in the bucket as the bucket is elevated. It is also important to maintain the bucket substantially vertical, and to prevent horizontal transitional movement thereof, as it is pushed into the ground, and means are provided for these purposes. Any substantial non-axial movement, or horizontal transitional movement, of the bucket would produce a horizontal shearing action in the earth at the lower edge of the bucket as it is pushed into the ground, and this would objectionably loosen the soil in the bucket.

Other objects are simplicity and economy of construction, and efficiency, dependability, and speed of operation.

Figure 1:
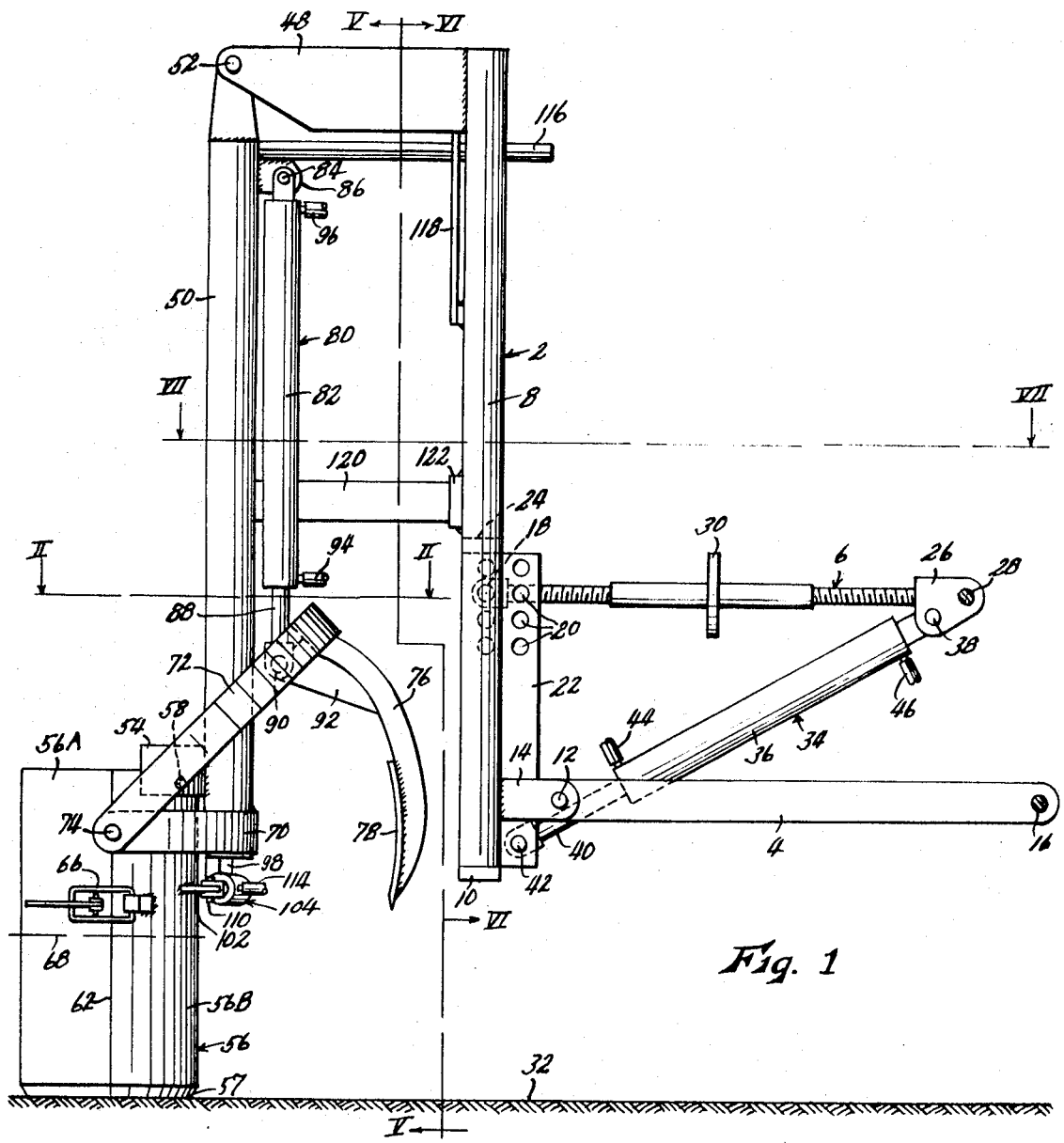
Figures 2, 3:
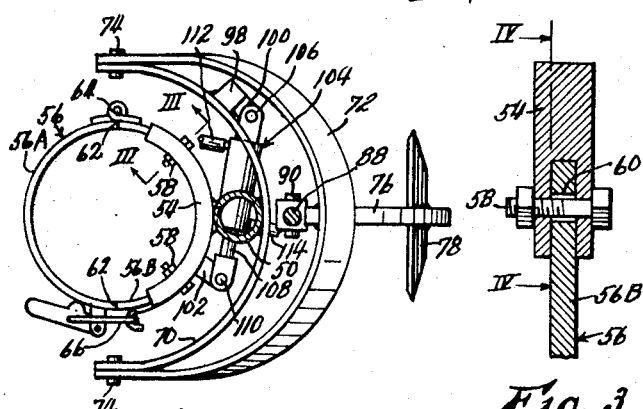
Figure 4:
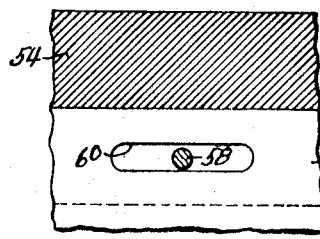

With these objects in view as well as other objects which will appear in the course of the specification, reference will be had to the accompanying drawing, wherein:

FIG. 1 is a side elevational view of a tree balling machine embodying the present invention, FIG. 2 is a sectional view taken on line II—II of FIG. 1, FIG. 3 is an enlarged, fragmentary sectional view taken on line III—III of FIG. 2, FIG. 4 is a fragmentary sectional view taken on line IV—IV of FIG. 3, FIG. 5 is a sectional view taken on line V—V of FIG. 1, FIG. 6 is a sectional view taken on line VI—VI of FIG. 1, and FIG. 7 is a sectional view taken on line VII—VII of FIG. 1.

Like reference numerals apply to similar parts throughout the several views, and the numeral 2 applies generally to a vertical A-frame which carries all other elements of the machine. Said A-frame is arranged in a vertical plane behind a tractor or the like, not shown, transversely to the direction of travel of the tractor, and is connected to said tractor by a pair of drawbars 4 and a turnbuckle link 6. Said A-frame consists of a pair of inclined side bars 8 rigidly joined together at their upper ends and rigidly joined at their lower ends by a horizontal cross bar 10. Each of drawbars 4 is pivoted at its rearward end, as at 12, to a forwardly extending ear 14 affixed to one side bar 8 of the A-frame, adjacent its lower end, and is pivoted at its forward end, as at 16, to the tractor itself. Pivots 16 are horizontally coaxial transversely of the tractor, as are pivots 12. Pivots 16 are fixed relative to the tractor. The rearward end of link 6 is pivoted on a pivot pin 18 inserted selectively through any of pairs of matching holes 20 formed in a pair of vertical plates 22 extending between cross bar 10 and an intermediate cross bar 24 of the A-frame, and said link is provided at its forward end with a head 26 which is pivoted to the tractor at 28, said pivot being fixed relative to the tractor. The length of link 6 may be adjusted by turning handwheel 30.

Drawbars 4 and turnbuckle link 6 thus form a parallelogram linkage supporting A-frame 2 from the tractor, whereby said A-frame may be raised or lowered relative to ground level 32. Since as will appear it is desirable that frame 2 remain vertical as it is raised and lowered, the parallelogram linkage should be true, that is, that link 6 be parallel to and equal in length to drawbars 4. The length adjustability of link 6 permits it to be adjusted to the length of the drawbars 4 with which any given tractor may be equipped. Also, pivots 16 and 28, which are fixed relative to the tractor, may vary from one model of tractor to another as to the horizontal and vertical spacing therebetween. This may be compensated for, and link 6 thus maintained parallel to drawbars 4, by insertion of pivot pin 18 in the properly selected set of holes 20 of plates 22. This should be done even if it results in a slight forward or rearward tilting of frame 2 (rearward being preferable) since its movement will then be vertical even though tilted.

A-frame 2 is raised and lowered by a hydraulic ram 34 extending diagonally across the parallelogram linkage just described, said ram including a hydraulic cylinder 36 pivoted to head 26 at 38, a piston (not shown) operable in said cylinder, and a piston rod 40 affixed to said piston and extending outwardly from said cylinder and pivotally connected, as at 42, between frame plates 22 adjacent cross bar 10. Said ram is double-acting, the cylinder being provided with hydraulic connections 44 and 46 to which hydraulic fluid may be selectively supplied to respectively raise or lower A-frame 2. The hydraulic system of pump, control valves, etc. for this purpose may be standard, and is not shown.

Affixed to the upper end of A-frame 2, and projecting rearwardly therefrom, is a heavy arm 48. Depending from the rearward end of said arm is a heavy post 50, said post being attached at its upper end to said arm by a universal swivel joint 52 (see FIG. 5). Welded or otherwise affixed to said post, adjacent the lower end thereof, is a downwardly opening, forwardly concave channel 54. Said channel engages over the upper edge of a vertical cylindrical bucket 56, whereby, with proper lubrication, said bucket can oscillate rotatably about its own axis within said channel, as will be described. Said bucket is retained in said channel by a plurality of bolts 58 (see FIGS. 2, 3, and 4) extending radially through the side walls of said channel and through the upper edge portion of the bucket, each bolt passing through a peripherally elongated slot 60 formed in the bucket so as not to interfere with rotary oscillation thereof.

Bucket 56 is diametrically and longitudinally split, as indicated at 62, to form a semi-cylindrical back section 56A and a semi-cylindrical front section 56B. These sections are pivotally joined at one side of the bucket by a hinge 64, whereby the back section may be swung horizontally outwardly to open the bucket, while the opposite edges of the sections may be releasably connected to secure the bucket closed by any suitable device, such as toggle clamp 66. Channel 54 engages only front bucket section 56B, and is of sufficiently less than 180 degrees angular extent that the bucket may be rotatably oscillated to the extent desired with no necessity that the junctures of the bucket sections enter therein. It will be understood that bucket 56 will be pushed into the ground only about halfway, or up to line 68 thereof, and that therefore all attachments thereto which could inhibit or resist its insertion are disposed above line 68.

Affixed to the lower end of post 50, below the top of bucket 56, is the midpoint of a horizontally semi-circular bracket 70, said bracket partially encircling said bucket, but being of larger diameter than said bucket so as to be spaced outwardly therefrom. A U-shaped yoke 72 has its ends pivoted respectively to the free ends of bracket 70, as by pivots 74, and extends forwardly of said bracket for pivotal movement both above and below said bracket. Pivots 74 are horizontal and coaxial, lying in the plane of split 62 of the bucket. Affixed to the forward midpoint of yoke 72 is a depending finger 76 to the lower end of which is fixed a triangular cut-off tool 78 formed of plate stock with sharpened edges. Both finger 76 and tool 78 are preferably curved so as to be generally concentric with yoke pivots 74. When yoke 72 is pivoted upwardly as shown in the drawing, tool 78 is disposed entirely above the line 68 of the bucket, and when said yoke is pivoted downwardly, tool 78 is moved to a generally horizontal position directly below the bucket.

Yoke 72 is pivoted by means of a hydraulic ram 80 including a cylinder 82 pivoted at its upper end, as at 84, to an ear 86 affixed to post 50 adjacent its upper end, a piston, not shown, operable in said cylinder, and a piston rod 88 affixed to said piston and extending downwardly from said cylinder, said piston rod being pivoted, as at 90, to an ear 92 affixed in yoke 72 adjacent finger 76. Ram 80 is double acting, having hydraulic connections 94 and 96 to cylinder 82 thereof to which hydraulic fluid may be supplied to respectively raise and lower yoke 72. The pump and hydraulic control system for ram 80 may be standard, and is not shown.

A post 98 is fixed to and depends from bracket 70 forwardly of the bucket. An ear 100 at the bottom of said post is connected to an ear 102 welded to front section 56B of the bucket by means of a hydraulic ram 104, the cylinder of said ram being pivoted to ear 100 at 106, and the piston rod 108 of said ram being pivoted to ear 102 at 110. Said ram extends substantially tangentially of the bucket, and is double-acting, having hydraulic connections 112 and 114 respectively at the opposite ends of the cylinder thereof, whereby as hydraulic fluid is fed alternately to said connections, bucket 56 is caused to oscillate rotatably about its axis, by sliding movement of the upper edge of section 56B thereof in curved channel 54. The control system of ram 184 may be standard, and is not shown.

Main bucket-supporting post 50 pivots freely on universal swivel 52, but to prevent unrestrained swivelling action thereof, which could occur as a counter-effect of oscillating the bucket in the ground, and which would tend to cancel out oscillation of the bucket relative to the ground, there is provided a stabilizer bar 116 affixed to post 50 adjacent its upper end. Said bar extends horizontally forwardly, and is retained loosely between a pair of vertical guide bars 118 (see FIG. 6) carried fixedly by A-frame 2. Also while post 50 is universally pivoted, it cannot be allowed to swing forwardly since this could cause interference with the motion of cut-off tool 78 by portions of A-frame 2. To prevent this, a bar 120 is affixed to post 50 intermediate its ends, and extends horizontally forwardly to abut a cross bar 122 extending horizontally across and affixed to A-frame 2. Thus post 50 can swing horizontally in either direction, or rearwardly, but not forwardly.

In operation, turnbuckle link 6 is first adjusted in length, and its pivot pin 18 inserted in the proper pair of holes 20 of plates 22, to constitute a true parallelogram with drawbars 4. A-frame 2 will then be disposed vertically, or at least will be moved vertically by operation of ram 34, presuming that the tractor to which the machine is attached is resting on level ground. Ram 34 at that time has been shortened by delivery of fluid to hydraulic connection 44 thereof to elevate bucket 56 above ground level, and ram 80 will have been shortened by delivery of fluid to hydraulic connection 94 thereof to elevate cut-off tool 78 above the plane of line 68 of the bucket, as shown in FIG. 1. The bucket is then positioned around the trunk of a small seedling tree or the like to be transplanted. In some cases this may be done by raising the bucket, then lowering it over the tree by operation of ram 34 after maneuvering the tractor to position the bucket directly over the tree. However, if the tree is too tall, or the foliage thereof is too large to permit this, bucket section 56A may be swung on hinge 64 to open the bucket, after first disengaging clamp 66, and the bucket then closed about the tree and clamped shut after maneuvering bucket section 56B into position by moving the tractor. The bucket should of course be positioned so that the tree trunk is disposed about axially therein.

Ram 34 is then actuated by delivery of fluid to connection 46 to forcibly lower bucket to press it into the ground. The lower edge of the bucket is sharpened, as indicated at 57, to facilitate its entry into the ground. The primary object of the invention is as already described the prevention or minimization of any loosening or disturbance of the earth retained within the bucket, whereby to protect the tree roots against drying air, and one of the factors involved is that the bucket should be disposed vertically, and remain vertical, as it is inserted into the ground without appreciable tilting or lateral movement. Such tilting or lateral movement would result in the production of progressive shear stresses in the earth at the plane of the lower edge of the bucket as it is inserted, and this would objectionably loosen the soil in the plug of earth within the bucket. In the present structure, post 50 and hence bucket 56 hang vertically from swivel 52 by gravity, and is moved vertically by the parallelograms linkage 4–6 supporting it from the tractor. Pivots 12 and 18 of the linkage do move forwardly relative to the bucket when pivoted below horizontal, but this is compensated for by placing the tractor wheels in a free-wheeling condition during insertion of the bucket into the ground. Thus the tractor is forced to roll rearwardly instead of the bucket being pulled or tilted forwardly, and the bucket is thus maintained vertical and inserted vertically into the ground. If the ground is sloping, the tractor is directed upwardly of the slope, and post 50 and bucket 56 remain vertical by swinging rearwardly on swivel 52 away from A-frame 2. Parallelogram linkage 4–6 would not then produce a truly vertical movement of the bucket, but the bucket may then be maintained nearly vertical, within acceptable limits, by turning handwheel 30 to shorten link 6.

Another factor in preventing disturbance of the earth in the plug of earth in the bucket is that the lower edge of the bucket should cut cleanly as it is pushed into the ground. If it is allowed to push the roots downwardly to any appreciable degree before cutting them, the displacement of the roots loosens the earth and will admit air to the plug. Small stones in the ground, if pushed by the bucket, could have the same effect. Sharpening the lower bucket edge partially solves the problems by providing for the cutting of at least small roots thereby. However, this alone would not provide for the severing of larger roots without substantial displacement thereof, and of course would have no effect on stones. Therefore, in the present structure, hydraulic fluid is fed alternately to connections 112 and 114 of ram 104 as the bucket is forced into the ground by ram 34, whereby to cause rotary oscillation of the bucket about its own vertical axis, within channel 54. This produces a sawing or slicing action of bucket edge 57 on roots, so that even larger roots can be severed without substantial displacement thereof, and also assists the bucket to deflect or push aside small stones which lie in its path. During this oscillation of the bucket, its upper edge rides against the base of channel 54, so that bolts 58 are not required to support the load, which may be quite large, and stabilizer bar 116 prevents post 50 from oscillating on swivel 52, which would otherwise of course tend to cancel oscillation of the bucket itself. Cutting edge 57 of the bucket is preferably smooth as shown, not serrated, since both roots and small stones tend to become lodged in serrations, and hence to be dragged horizontally in the ground by oscillatory movement of the bucket, and this would tend to loosen the earth inside the bucket and hence would be objectionable.

After the bucket has been inserted as described to the desired depth in the ground, say to line 68 thereof, ram 80 is extended by delivery of hydraulic fluid to connection 96 thereof to pivot yoke 72 forcibly downwardly about pivots 74 to insert cut-off tool 78 into the ground, said tool following an arcuate path, until it is disposed directly beneath and in close proximity to the lower end of bucket 56, said tool thus severing any roots, particularly a taproot if such exists, which may then project from the bottom of the bucket. The arcuate shape of said tool, and its sharpened edges, permit it to penetrate the earth and sever the roots with reasonable pressure thereon. With the proportions shown, portions of yoke 72 must also be pressed into the ground, but with said yoke configurated as shown, so that it enters the earth parallel to the plane of the flat stock of which it is formed, this may be accomplished easily.

Finally, leaving cut-off tool 78 in position beneath the bucket, ram 34 is retracted by delivery of fluid to connection 44 thereof to lift the tree, and the plug of earth surrounding its roots, above ground level, tool 78 then serving to prevent earth from falling from the interior of the bucket, whereby to maintain the earth plug intact. The earth plug, still in the bucket, may then be positioned over a sheet of burlap or the like, deposited on said sheet by retracting tool 78 and releasing clamp 66 to open the bucket, and wrapping said burlap tightly about the earth plug to secure it for convenient handling, and transportation. Such wrapping methods, materials, and apparatus, however, form no part of the present invention and are therefore not here illustrated.

While I have shown and described a specific embodiment of my invention, it will be readily apparent that many minor changes of structure and operation could be made without departing from the spirit of the invention.

What I claim as new and desire to protect by Letters Patent is:

1. A tree balling attachment for tractors or the like comprising:
   (a) a vertically disposed cylindrical bucket open at top and bottom adapted to be positioned about a tree in generally centered relationship thereto, above ground level, said bucket being vertically and diametrically divided to constitute two semi-cylindrical sections,
   (b) supporting means carrying said bucket and adapted to be attached to said tractor, said supporting means being yieldable to permit vertical movement of said bucket relative to said tractor, and including a downwardly opening, horizontally arcuate channel in which the upper edge of said bucket is slidably engaged, whereby said bucket may be oscillated about its vertical axis, said channel being of less than 180 degrees in angular extent and engaging the upper edge of only one of said bucket sections,
   (c) bolts secured in the side walls of said channel and extending through peripherally elongated slots in said bucket,
   (d) a first power means operable to selectively raise or lower said supporting means whereby said bucket may be either raised above ground level, or pressed downwardly into the ground around the roots of said tree, and
   (e) a second power means carried by said supporting means and operable to oscillate said bucket in said channel.

2. A device as recited in claim 1 wherein said second power means constitutes a horizontally extending, double-acting, hydraulic ram extending generally tangentially to said bucket, said ram being connected at one end to said bucket and at its opposite end to said supporting means.

References Cited
UNITED STATES PATENTS

| | | | |
|---|---|---|---|
| 155,707 | 10/1874 | Carroll | 294—50.7 |
| 2,601,609 | 6/1952 | Harbison et al. | 172—444 |
| 2,729,493 | 1/1956 | Engel | 37—2 R UX |
| 2,779,111 | 1/1957 | Cartwright, Jr. | 37—2 R |
| 2,863,258 | 12/1958 | Gish | 37—2 R |
| 3,017,709 | 1/1962 | Sigler | 37—2 R |
| 3,032,903 | 5/1962 | Ede | 37—193 |
| 3,210,867 | 10/1965 | Daniels, Jr. | 37—2 R |
| 3,310,121 | 3/1967 | Hussar | 294—50.8 X |
| 3,341,253 | 9/1967 | Hostetter | 37—193 |
| 3,467,203 | 9/1969 | Johnson | 175—171 X |

ROBERT E. PULFREY, Primary Examiner

R. E. SUTER, Assistant Examiner